Nov. 27, 1956 A. E. HOSIER ET AL 2,771,724
TWO-COMPARTMENT CONTAINER AND METHOD OF MAKING SUCH CONTAINER
Filed Nov. 9, 1953

INVENTORS
ALBERT E. HOSIER &
BY ROBERT C. BUTLER

ATTORNEYS

United States Patent Office 2,771,724
Patented Nov. 27, 1956

2,771,724

TWO-COMPARTMENT CONTAINER AND METHOD OF MAKING SUCH CONTAINER

Albert E. Hosier and Robert C. Butler, Ashland, Ohio, assignors to The Faultless Rubber Company, Ashland, Ohio, a corporation of Ohio Application November 9, 1953, Serial No. 390,911

6 Claims. (Cl. 53—14)

This invention relates to flexible, two-compartment containers, or packages and to methods of making such containers or packages.

In packaging various articles, it frequently is desirable to package two different articles in a multi-compartment container unit. These different materials contained in the unit are in some instances adapted to be delivered simultaneously for mixture and use at a common time, or in some instances, the two materials may be desired to be used at different times. In all events, various types of two-compartment containers have been provided heretofore for use in the packaging of various types of special materials. Another type of materials which frequently use multi-compartment containers are rubber cements made from various types of natural or synthetic rubbers, or rubber-like materials wherein it is necessary to retain the accelerators for the rubber cements separate from the main body of the cement until a time immediately prior to use of the rubber cement. Preferably the accelerator and the rubber cement should be thoroughly and uniformly mixed together in a sealed container before use of the materials. Insofar as we are aware, it has been very difficult, if not impossible, to package materials such as rubber cements in any suitable inexpensive type of a container. This container normally should be made from flexible plastic material, it must be relatively inexpensive to make and it should be easily filled with the ingredients to be carried therein. Also, the package should insure that the two component materials contained therein are maintained in air tight compartments and be separated from each other until the user desires to mix such component materials together.

It is the general object of the present invention to provide a novel, flexible container of the type referred to which is characterized by the provision of two separate compartments in the container and by the convenience of changing the two compartments in the container into one sealed compartment for convenient mixture of the two ingredients in the container prior to use of the resultant mixture.

Another object of the invention is to provide a relatively uncomplicated, easily practiced method for providing a two-compartment container from sheets or tubes of plastic material.

Yet another object of the invention is to provide a multi-compartment container for rubber cements or the like wherein a relatively stiff end portion is provided on the container for use in applying or spreading liquid material initially contained in the container.

Yet another object of the invention is to provide a container having two compartments therein and an uncomplicated method of manufacturing the container wherein the compartments of the container are of different sizes.

A further object of the invention is to provide permanent seals in a two-compartment container and a temporary seal separating the compartments in the container so that breaking the semi-permanent seal in the container can be effected without any damage to the permanent seals forming the main sealing portions of the unitary resultant container.

The foregoing and other objects and advantages of the invention will be made more apparent as the specification proceeds.

For a better understanding of the present invention, reference should be had to the accompanying drawings, wherein Fig. 1 is a section through plastic material which may be used in the manufacture of a multi-section container of the invention, showing several alternate forms of starting materials;

In referring to the accompanying drawings, and the following specification, corresponding numerals will be used to refer to corresponding parts to facilitate reference between such corresponding parts in the drawing and specification.

The present invention relates to a two-compartment, flexible plastic container comprising a generally tubular structure having a pair of integral pull tabs on opposite sides thereof extending in parallel relation to each other along an axis of the structure, a pair of end seals are provided closing opposite ends of the tubular structure with end portions of the pull tabs being integrally secured to and forming a part of the end seals to avoid any breakage of the end seals by use of the pull tabs. A semi-permanent relatively weak seal is provided in the structure and extends the length thereof adjacent the pull tabs to form the two different compartments in the plastic container.

The flexible, or plastic container of the invention usually is made from a plastic sheet made from a material adapted to be heat sealed when superimposed plies or layers of the material are subjected to a hot sealing disc or iron of conventional construction. Thus the container of the invention may be made from cellophane, polyethylene, acetates, polyvinyl alcohol, or similar materials, such as rubber hydrochlorides, etc. However, the use of polyvinyl alcohol sheets of films in making the plastic, flexible container of the invention is particularly desirable in many instances inasmuch as such particular material is inert under normal temperatures and pressures with relation to aromatic substances frequently used in compounding various types of rubber or synthetic cements.

Figure 1:
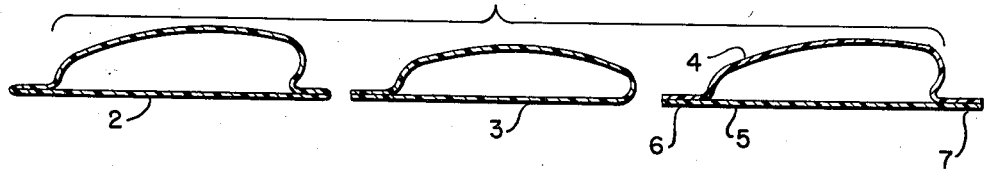
Figure 6:
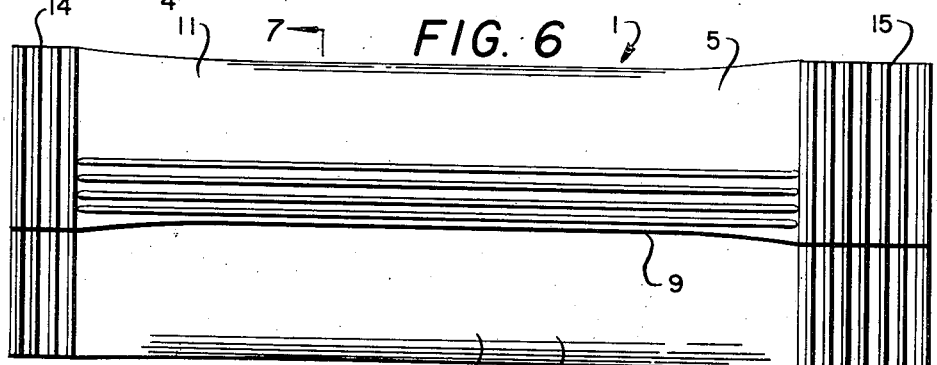
Fig. 6 is an elevation of the completed container embodying the principles of the invention with the final end seal being provided thereon.
Figure 7:
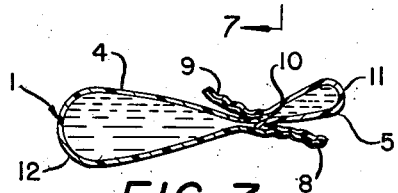
Fig. 7 is a vertical cross section taken through the container of Fig. 6 showing the container with the sections or compartments thereof filled with liquid material.

Reference now is directed to the details of the structure shown in the accompanying drawings, and a completed container of the invention is indicated as a whole by the numeral 1 in Fig. 6. This container 1 is made from a pair of superimposed plies of flexible plastic sheet material. Originally, these plies of the plastic sheet material may be presented for processing in the form of a substantially flattened tube, or they may comprise one sheet of plastic material doubled back upon itself to form a closed loop from the sheet of material, or the structure may be made from two entirely separate plies placed upon each other in superimposed relation. Thus a tube of plastic material is indicated by the numeral 2, while a looped sheet of plastic material 3 is shown substantially ready for the first step in the process of the invention, in Fig. 1, whereas superimposed plies or layers 4 and 5 of the plastic material are also shown in Fig. 1 with abutted edge portions indicated at 6 and 7. These edge portions 6 and 7 and layers 4 and 5 are prepared for the first processing operation in making a multi-section container.

Figure 2:
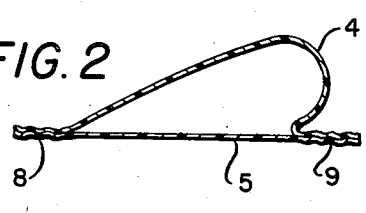
Fig. 2 is a section similar to Fig. 1 after an edge sealing operation has been performed on the material shown in Fig. 1.
Figure 3:
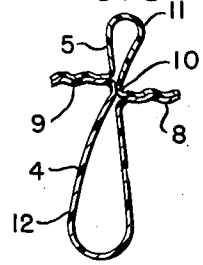
Fig. 3 is a section through the plastic material used in forming the container of the invention after the next forming operation has been performed thereon to divide the tubular material of Fig. 2 into two compartments.

Fig. 2 shows the assembled layers 4 and 5 after edge seals 8 and 9 have been formed by conventional heat sealing irons or similar members in the edge portions 6 and 7 of the assembled plastic layer unit. These edge seals 8 and 9 usually are corrugated and are relatively stiff with relation to the remainder of the container 1 and are provided to facilitate the breaking of a semi-permanent seal provided in the container 1 to make it a unitary container to mix the contents of the initially separate compartments or sections therein, as hereinafter explained. After the operation of sealing the edges of the container unit has been performed, then the edge seals 8 and 9 are brought into adjacent relationship in the container unit, as indicated in Fig. 3, and a semi-permanent seal 10 is made in the container unit. Normally this seal 10 is of appreciably less area than the edge seals 8 and 9 and this aids in making such seal 10 of a semi-permanent construction with relation to the edge seals 8 and 9. The same or smaller amounts of heat and pressure may be applied in forming the seal 10, as is used in making the seals 8 and 9. Fig. 3 also shows that the semi-permanent seal 10 is preferably positioned intermediate the edge seals 8 and 9 after they have been brought into adjacent relationship and this facilitates the breaking of such seal 10 by use of the seals 8 and 9 as pull tabs, as hereinafter disclosed and described in more detail. The semi-permanent seal 10 would extend the internal length of the container 1 to provide the desired sections or compartments therein, and it may be positioned adjacent either edge seal 8 and 9, as desired, but not intermediate the pair of edge seals.

Fig. 3 shows that a pair of compartments are provided by bringing opposed portions of the layers 4 and 5 into contact in the container member. Thus a relatively small compartment 11 is provided in one loop in the container whereas a relatively large compartment 12 is formed by the other sheet or layer 4 in the container member being processed. This facilitates storing a relatively small quantity as an accelerator, for example, in the small compartment 11, whereas the remaining ingredients of the cement and which form the larger volume thereof would be positioned in the compartment 12.

Figure 4:
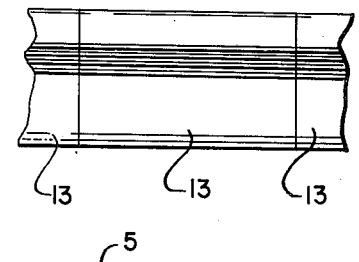
Fig. 4 is an elevation showing the next operation in one embodiment of the invention of cutting an elongate container structure into container length.
Figure 5:
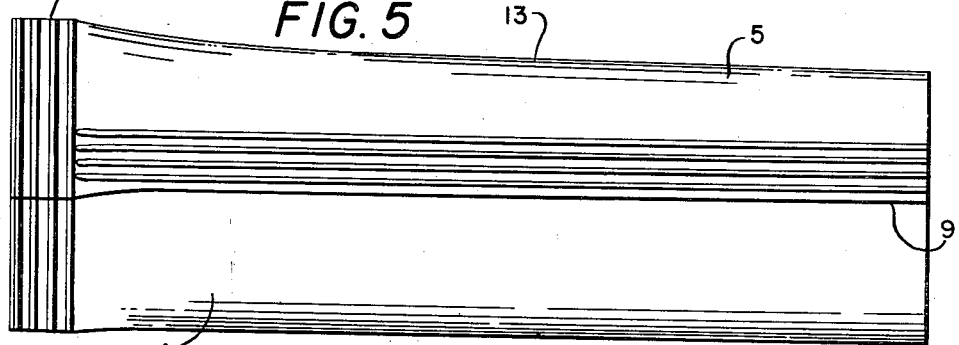
Fig. 5 is an elevation of a container after one end of the container section of Fig. 4 has been sealed.

It will be realized that the structure shown in Figs. 1 through 3 may be of any desired length and usually would be relativley continuous or elongate structures so that Fig. 4 shows that the elongate structure normally processed in Figs. 1 through 3 can be cut into a plurality of container sections 13 each of which would be of a desired container length. Usually the edge seals 8 and 9 would be flattened down tor pressed against the different compartments or loops provided in the container section as it is being processed, for example, being cut to a desired length. The terms "edge seals" and "end seals" are used with relation to the container illustrated and the container conceivably may be wider than it is long.

The container section 13 is next sealed at one end thereof by means of an end seal 14 which usually would be of a relatively stiff construction and would usually be corrugated. With some types of heat sealed joints, or materials, the end seals 14 and similar seals in the container may be of substantially the same flexibility as the remainder of the container. Next the various materials to be positioned in the compartments 11 and 12 would be placed therein after which the remaining end seal 15 would be formed at the remaining end of the container section to complete the container 1. It should be noted that the end seal 15 preferably is of substantially twice the area of the end seal 14 to provide a relatively stiff end portion on the cointainer 1. Thus, for example, the end seal 14 may be about ½" wide and the end seal 15 about 1" wide. This relatively stiff end portion of the container can be used for applying rubber cements or similar materials initially contained in the different compartments of the container.

In use of the container 1, it will be seen that the edge seals 8 and 9 are free from the remainder of the container at the middle portions of the container and are relatively free to be grasped manually. Thus tensional pressure applied to the container through such seals 8 and 9 can be used to break the semi-permanent seal 10 and make the interior of the container 1 a unitary compartment so that the ingredients originally separated by means of the seal 10 can be conveniently mixed within a sealed container. After such mixture action has been secured, either one of the layers 4 or 5 can be punctured or broken by suitable means so that the liquid material or substances within the container 1 can be caused to flow therefrom onto any desired surface or article. The end seal 15 then provides a convenient member for spreading or processing such materials to spread them onto the desired surface.

The layers of material 4 and 5 may be of any suitable thickness such as about .006" and are stronger than the relatively small area of heat-sealed connections formed between the layers 4 and 5 by the semi-permanent seal 10. Hence such seal 10 can be broken by tensional forces applied to the edge seals 8 and 9 without any real chance of tearing the layers 4 and 5 by such forces. Inasmuch as the ends of the edge seals 8 and 9 are secured to and made integral parts of the end seals 14 and 15, the separating pressures or forces applied to the edge seals 8 and 9 will not cause the heat-sealed end portions thereof bonded to and forming part of the end seals 14 and 15 to pull away from such end seals. Thus no real likelihood of leaks being made in the container 1, or other damages occurring to destroy the sealed unitary compartment provided thereby exists when destroying the semi-permanent seal 10. This semi-permanent seal 10 may, for example, be between about 1/16" to 1/8" in width and the multi-layer pull tabs provided in the container are of relatively great strength with relation to the semi-permanent seal 10.

In some instances, it may be desirable to provide one or more extra semi-permanent seals, like the seals 10, in the container so that additional compartments may be provided therein. This seal might be below the pull tab 8 as shown in Fig. 3. Yet a third pull tab could also be provided on the opposite side of such added semi-permanent seal from the pull tab 8 by folding over, or collapsing part of the loop 12 and heat sealing it to make a pull tab.

From the foregoing, it is contended that a relatively easily practiced method has been provided for forming a multi-compartmented container from plastic material and with such container being of a sturdy construction. The flexible plastic container may be placed in any desired type of an outer, or carrier container. The multi-compartment container is adapted to permit unification of contents initially separated in the container for mixing action in a sealed portion thereof so that the objects of the invention are achieved.

While several complete embodiments of the invention have been disclosed herein, it will be appreciated that modification of these particular embodiments of the invention may be resorted to without departing from the scope of the invention as defined in the appended claims.

What we claim is:

1. A method of making a two section container comprising heat sealing opposed edge portions of two layers of thin flexible plastic material, bringing the sealed edge portions into adjacent relation to form two loops from the plastic material, forming a semi-permanent seal between the two layers of plastic material adjacent the sealed edge portions and parallel to such sealed edge portions to form two compartments from the plastic material, folding the sealed edge portions over against the plastic material and flattening the plastic material, cutting a container section from the plastic material, permanently sealing one end of the container section, filling the compartments of the container section, and sealing the remaining end of the container section.

2. A method of making a two section container comprising heat sealing superimposed opposed edge portions of a flattened two layer unit of thin flexible plastic material together, moving the sealed edge portions of the unit into adjacent relation to form two loops from the layers of plastic material, forming a semi-permanent seal between the two layers of plastic material adjacent the sealed edge portions to form two compartments from the layers of plastic material, folding the sealed edge portions over against the plastic material and flattening the plastic material to provide a container section, permanently sealing one end of the container section, filling the compartments of the container section, and sealing the remaining end of the container section.

3. A method of making a two section container comprising forming thin flexible plastic material into a two layer unit with relatively stiff sealed edge portions, the layers of the unit being of different widths, bringing the sealed edge portions into adjacent relation to form two different sized loops from the plastic material, forming a semi-permanent seal between the two layers of plastic material adjacent the sealed edge portions to form two compartments from the layers of the plastic material, folding the sealed edge portions over against the plastic material and flattening the plastic material, cutting a container section from the plastic material, permanently sealing one end of the container section and including ends of the sealed edge portions in the end seal, filling the compartments of the container section, and sealing the remaining end of the container section.

4. A method of making a two section container comprising forming thin flexible plastic material into a two layer unit with relatively stiff sealed edge portions, the layers of the unit being of different widths, bringing the sealed edge portions into adjacent relation to form two different sized loops from the plastic material, forming a semi-permanent seal between the two layers of plastic material adjacent the sealed edge portions to form two compartments from the layers of the plastic material, folding the sealed edge portions over against the plastic material and flattening the plastic material, cutting a container section from the plastic material, and permanently sealing one end of the container.

5. A process of making a multi-section package comprising the steps of providing an elongate tubular structure of flexible plastic material, flattening the tubular structure and sealing the edges of the structure to provide airtight seams thereat, which seams are corrugated and are about ½ inch wide and which provide one layer in the flattened structure longer than the other layer to loop between the sealed edges, bringing the sealed edges into adjacent but spaced relation with material from the two layers in contact to provide two compartments in the structure, sealing the contacting layer material by a relatively narrow semi-permanent seal to provide two compartments sealed from each other, the said seams being positioned outside of the two compartments on opposite sides of the semi-permanent seal, flattening the seams on the compartmented structure and sealing one end thereof by a permanent seal about ½ inch wide with the ends of the said seams being secured thereto, filling the compartments with different materials to be mixed together prior to their use, and sealing the open end of the compartment structure by a permanent seal about 1 inch long and binding tthe ends of the said seams thereto as an integral part of such end seal.

6. A process of making a multi-section package comprising the steps of providing an elongate tubular structure, flattening the tubular structure and sealing the edges of the structure to provide airtight seams thereat, which seams provide one layer in the flattened structure longer than the other layer to loop between the sealed edges, bringing the sealed edges into adjacent but spaced relation with material from the two layers in contact to provide two compartments in the structure, sealing the contacting layer material by a relatively narrow semi-permanent seal to provide two compartments sealed from each other, the said seams being positioned outside of the two compartments on opposite sides of the compartmented structure, flattening the seams on the compartmented structure and sealing one end thereof by a permanent seal with the ends of the said seams being secured thereto, filling the compartments with different materials to be mixed together immediately prior to their use within the package, and sealing the open end of the compartment structure by a permanent seal and binding the ends of the said seams thereto as an integral part of such end seal.

References Cited in the file of this patent

UNITED STATES PATENTS

| | | |
|---|---|---|
| 2,245,738 | Taylor | June 17, 1941 |
| 2,335,159 | Salfisberg | Nov. 23, 1943 |
| 2,420,983 | Salfisberg | May 20, 1947 |
| 2,600,216 | Denison | June 10, 1952 |
| 2,605,896 | Rohdin | Aug. 5, 1952 |
| 2,606,412 | Salfisberg | Aug. 12, 1952 |